United States Patent
Lynch

(10) Patent No.: US 9,921,855 B2
(45) Date of Patent: Mar. 20, 2018

(54) SYSTEMS AND METHODS FOR GENERATING AN INTERACTIVE USER INTERFACE FROM A DATABASE

(71) Applicant: JM Consulting, Alexandria, VA (US)

(72) Inventor: Karin Lynch, Alexandria, VA (US)

(73) Assignee: JM Consulting, Alexandria, VA (US)

( * ) Notice: Subject to any disclaimer, the term of this patent is extended or adjusted under 35 U.S.C. 154(b) by 55 days.

(21) Appl. No.: 14/663,057

(22) Filed: Mar. 19, 2015

(65) Prior Publication Data
US 2016/0018953 A1    Jan. 21, 2016

Related U.S. Application Data

(60) Provisional application No. 62/026,155, filed on Jul. 18, 2014.

(51) Int. Cl.
| | |
|---|---|
| *G06F 3/048* | (2013.01) |
| *G06F 9/44* | (2018.01) |
| *G06F 17/30* | (2006.01) |
| *G06F 3/0484* | (2013.01) |

(52) U.S. Cl.
CPC .......... *G06F 9/4443* (2013.01); *G06F 3/0484* (2013.01); *G06F 17/3089* (2013.01); *G06F 17/30893* (2013.01)

(58) Field of Classification Search
CPC .... G06F 3/0481; G06F 3/0484; G06F 9/4443; G06F 17/3089; G06F 17/30893
See application file for complete search history.

(56) References Cited

U.S. PATENT DOCUMENTS

| | | |
|---|---|---|
| 6,507,833 B1 | 1/2003 | Hichwa et al. |
| 6,950,993 B2 | 9/2005 | Breinberg |
| 6,957,392 B2 | 10/2005 | Simister |
| 7,174,286 B2 | 2/2007 | Martin et al. |
| 7,178,129 B2 | 2/2007 | Katz |

(Continued)

OTHER PUBLICATIONS

Arens et al., "Automatic construction of user-interface displays," AAAI, 1988, vol. 88, http://aaaipress.org/Papers/AAAI/1988/AAAI88-143.pdf.

(Continued)

*Primary Examiner* — Andrew T Chiusano
(74) *Attorney, Agent, or Firm* — Bookoff McAndrews, PLLC

(57) ABSTRACT

Systems and methods are provided for generating interactive user interface pages from a data store. At least a portion of metadata is received from a data store, wherein the appearance and functionality of a plurality of interactive user interface pages is based on the metadata. The display and functionality of an interactive maintenance page is generated based on at least a portion of the metadata, wherein the interactive maintenance page is one of the plurality of interactive user interface pages, and wherein the interactive maintenance page maintains the plurality of interactive user interface pages. One or more instructions are received from the interactive maintenance page. The metadata is updated based upon the one or more instructions, and the appearance and functionality of at least one of the interactive user interface pages and/or the interactive maintenance page is modified based on the metadata.

20 Claims, 19 Drawing Sheets

(56) References Cited

U.S. PATENT DOCUMENTS

| | | | |
|---|---|---|---|
| 7,275,098 B1* | 9/2007 | Becher | G06F 3/0607 709/223 |
| 7,954,066 B2 | 5/2011 | Simister | |
| 2002/0194090 A1 | 12/2002 | Gagnon et al. | |
| 2003/0018665 A1* | 1/2003 | Dovin et al. | 707/513 |
| 2005/0193029 A1 | 9/2005 | Rom et al. | |
| 2005/0262194 A1 | 11/2005 | Mamou | |
| 2006/0095835 A1 | 5/2006 | Kennedy et al. | |
| 2007/0180386 A1* | 8/2007 | Ballard et al. | 715/744 |
| 2008/0046462 A1 | 2/2008 | Kaufman et al. | |
| 2008/0301552 A1* | 12/2008 | Bartek et al. | 715/700 |
| 2010/0313122 A1* | 12/2010 | Sandford | 715/273 |
| 2010/0332993 A1 | 12/2010 | Bousseton et al. | |
| 2011/0191702 A1* | 8/2011 | Lunsford | G06F 3/048 715/763 |
| 2012/0137235 A1 | 5/2012 | Ts et al. | |
| 2013/0268872 A1 | 10/2013 | Yin et al. | |
| 2014/0040177 A1* | 2/2014 | Sherman et al. | 706/47 |
| 2014/0047413 A1 | 2/2014 | Sheive et al. | |
| 2014/0082155 A1* | 3/2014 | Abrams et al. | 709/220 |
| 2014/0089890 A1* | 3/2014 | Martin et al. | 717/105 |
| 2015/0073955 A1* | 3/2015 | Gilman | G06Q 30/04 705/34 |

OTHER PUBLICATIONS

Janssen et al., "Generating user interfaces from data models and dialogue net specifications," Proceedings of the INTERACT'93 and CHI'93 conference on human factors in computing systems. ACM, 1993, http://dl.acm.org/ft_gateway.cfm?id=169335&ftid=51827&dwn=1&CFID=524625068&CFTOKEN=52328925.

Nadkarni et al., "WebEAV Automatic Metadata-driven Generation of Web Interfaces to Entity-Attribute-Value Databases," Journal of the American Medical Informatics Association, 2000, vol. 7.4, pp. 343-356., http://jamia.bmj.com/content/7/4/343.full.pdf+html.

Yoder et al., "Architecture and design of adaptive object-models," ACM Sigplan Notices, 2001, vol. 36.12, pp. 50-60, http://www.itu.dk/courses/VOP/E2008/lessons/12_AOM.pdf.

International Search Report issued in PCT/US15/40744 on Oct. 13, 2015 (10 pgs).

* cited by examiner

HOME>REQUEST  ~205

REQUEST

REQUESTS BEING ENTERED BY RECRUITING

220 ~ CREATED BY: [ ]  ASSIGNED TO: [ ⌄ ]  FILTER

OK  CANCEL  CREATE REQUEST  ~210

| REQUEST DATE* | REQUEST TYPE* | PERSON | STATUS |
|---|---|---|---|
| 09-AUG-09 | NO OBJ | SEVEN, EDWARD C (7777) | BEING ENTERED BY RECRUITING Edit |
| 29-May-13 | CLEARANCE DOWNGRADE | | BEING ENTERED BY RECRUITING Edit ~215 |
| 11-Jun-13 | MRPT | | BEING ENTERED BY RECRUITING Edit |

203

OK  CANCEL  CREATE REQUEST  ~210

Go to top

HOME > REQUEST > EDIT REQUEST

EDIT REQUEST

[ OK ] [ CANCEL ] [ COMPLETE REQUEST ]

REQUEST BEING ENTERED BY RECRUITING

| Field | Value |
|---|---|
| REQUEST TYPE* | NO OBJ |
| REQUEST DATE* | 09-Aug-06 |
| PROGRAM* | Test Program Name ~310 |
| CLEARANCE LEVEL | No Objection |
| PROPOSED COUNTRY LOCATION | United States of America |
| PROPOSED JOB/POSITION | |
| PROPOSED START DATE | 01-Dec-09 |
| ID NUMBER | 777-77-7777 (SSN)  315 |
| PREFIX | |
| FIRST NAME | Edward |
| MIDDLE NAME | Charles |
| LAST NAME | Seven |
| SUFFIX | |
| E-MAIL ADDRESS | charles.seven@gmail.comcharles.seven@gmail.comcharles.seven@gmail.comcharles.seven@gmail.comcharles.seven@gmail.comcharles.seven@gmail.comcharlesEND |
| CURRENT MAILING ADDRESS | 1 / 1 / 1 |
| CITY | 1 |
| STATE, COUNTRY | AE, United States of America |
| ZIP CODE | 1 |
| DATE OF BIRTH | 01-Nov-70 |
| CITY OF BIRTH | New York City |
| STATE, COUNTRY OF BIRTH | New York, United States of America |
| COUNTRY OF CITIZENSHIP | United States of America |
| PROOF OF CITIZENSHIP PROVIDED? | ☑ |
| MARITAL STATUS | Single |
| BRANCH OF SERVICE | |
| SEPARATION/RETIREMENT DATE | |
| STATUS | Being Entered by Recruiting |
| RECRUITER | Stone,C |
| REMARKS | |

307 ~ {
ALIAS
PHONE NUMBER
PRIOR MISSION
REQUEST DOCUMENT
PERSON DOCUMENT
REJECTION HISTORY
}

~305

[ OK ] [ CANCEL ] [ COMPLETE REQUEST ]

FLEXIBLE MODULE MAINTENANCE SCREEN

HOME > FLEXIBLE MODULE > EDIT FLEXIBLE MODULE

EDIT FLEXIBLE MODULE

FLEXIBLE FILTER
FLEXIBLE TITLE
FLEXIBLE BUTTON
FLEXIBLE LINK
FLEXIBLE COLUMN
FLEXIBLE LAYOUT
} 505

| | MODULE* | REQU002-Update Request |
|---|---|---|
| 507 | TABLE NAME* | REQUEST_DN |
| 510 | D SCREEN TITLE* | Request |
| 515 | E SCREEN TITLE* | Edit Request |
| 520 | INSERT ON SCREEN* | E ˅ |
| 525 | WHERE CLAUSE TEXT | completed_flag_dn = 'N' |
| 530 | ORDER BY CLAUSE TEXT | CREATED_DATE_DN, rtcece_request_code, person_name |
| 535 | ADDITIONAL PRIVILEGE Sql TEXT | select get_privilege ('U' , '< p_moduleCode/>' , null) from dual |
| 540 | FILTER QUERY? | ☑ |
| 545 | FILTER BUTTON TEXT | Filter |
| 550 | MULTIPLE SELECTION? | ☐ |
| 555 | ROW TAG TEXT | |
| 560 | ROW TAG STYLE TEXT | |
| 565 | ROW STYLE Sql TEXT | |
| 570 | ROW STYLE TEXT | background-color :#C5E3BF; |
| 575 | ROW STYLE MOD NUMBER | 2 |
| 580 | BREAK DATA CODE | ˅ |
| 585 | BREAK DATA BY ROW MOD NUMBER | |
| 587 | BREAK DATA BY ROW REM NUMBER | |
| 589 | BREAK BY ROW HTML TEXT | |
| 591 | PERFUNCTORY DISPLAY Sql TEXT | |
| 593 | PERFUNCTORY INSERT Sql TEXT | |
| 595 | PERFUNCTORY UPDATE Sql TEXT | |

[ OK ]  [ CANCEL ]  [ DELETE ]

EDIT FLEXIBLE FILTER DETAIL

HOME > FLEXIBLE MODULE > EDIT FLEXIBLE MODULE > FLEXIBLE FILTER DETAIL > EDIT FLEXIBLE FILTER DETAIL

MODULE: REQU002- REQUEST

| | |
|---|---|
| FLEXIBLE DETAIL ID* | 177 |
| MODULE* | REQUEST-(REQU002) ▼ |
| FLEXIBLE DISPLAY TEXT* | Created By: |
| FILTER COLUMN TEXT* | CREATE_USER |
| DATA TYPE* | Character Field ▼ |
| FILTER DATA LENGTH* | 75 |
| PRINT ORDER* | 10 |
| FILTER Ddlb Sql TEXT  (705) | select distinct rtdn.create_user, format_user_account_name (urat.application_login_name, pn.last_name, pn.first_name, pn.middle_name) from request_dn rtdn, user_account urat, person pn where rtdn.create_user = urat.application_login_name (+) and urat.pn_person_id = pn.person_id (+) and complated_flag_dn =N' and Y' =(select decode (count(*), 0, 'N', 'Y' ) user_program_role where urat.application_login_name = USER and rece_role_code =' and set_active_flag (grant_date, revoke_date) = 'Y' order by 2 |
| DEFAULT FILTER VALUE | |
| DEFAULT FILTER VALUE Sql TEXT | |
| FILTER VALUE | |
| FILTER PRIVILEGE Sql TEXT | |

OK    CANCEL    DELETE

*FIG. 7*

FLEXIBLE TITLE MAINTENANCE SCREEN

FLEXIBLE TITLE

[ INSERT ] [ CANCEL ]

MODULE: REQU002- REQUEST

| | FLETE TYPE* | REQUERY? | DISPLAY ORDER | BA TITLE Sql TEXT* | BA TITLE PRIVILEGE Sql TEXT | |
|---|---|---|---|---|---|---|
| 805 | D-Screen | No | 10 | selected 'REquest being En.... | | Edit |
| | E-Screen | No | 10 | selected ***DOSIneligibl.... | | Edit |

[ INSERT ] [ CANCEL ]

FIG. 8A

HOME > FLEXIBLE MODULE > EDIT FLEXIBLE MODULE > FLEXIBLE TITLE > EDIT FLEXIBLE TITLE

EDIT FLEXIBLE TITLE

MODULE: REQU002- REQUEST

| FLEXIBLE TITLE ID* | 1005 |
| FEME MODULE CODE | REQUEST-(REQU002) ▼ |
| 810 ⌒ FLETE TYPE* | D-SCREEN ▼ |
| REQUERY? | ☐ |
| 815 ⌒ PRINT ORDER* | 10 |
| 820 ⌒ Ba TITLE Sql TEXT* | select ' Requests being Entered by Recruiting' from dual |
| Ba TITLE PRIVILEGE Sql TEXT | |
| Ba TITLE STYLE TEXT | |
| Ba TITLE STYLE Sql TEXT | |

[ OK ] [ CANCEL ] [ DELETE ]

FIG. 8B

| HOME > FLEXIBLE MODULE > EDIT_FLEXIBLE MODULE > FLEXIBLE BUTTON > EDIT FLEXIBLE BUTTON |
|---|

EDIT FLEXIBLE BUTTON

MODULE: REQU002- REQUEST

| | |
|---|---|
| FLEXIBLE BUTTON ID* | 4908 |
| MODULE* | REQUEST (REQU002) ▼ |
| BUTTON DISPLAY TEXT* | PHONE NUMBER |
| DISPLAY ORDER* | 20 |
| 1005 — BUTTON LINK TEXT | /GENU003.aspx?moduleCode=REQU004&moduleType=D&RT_D=<T_REQUEST_ID>&RPID=<T_REQUEST_PERSON_ID> |
| 1007 — BUTTON LINK Sql TEXT | |
| 1010 — BUTTON PROCEDURE TEXT | |
| BUTTON PRIVILEGE TAG TEXT | |
| 1013 — JAVASCRIPT TEXT | |
| 1015 — BUTTON PRIVILEGE Sql TEXT | select substr(get_privilege ('M', 'REQU004', null, 2, 1 from dual |
| D SCREEN TOP? | ☐ |
| D SCREEN BOTTOM? | ☐ |
| E SCREEN TOP? | ☐ |
| E SCREEN BOTTOM? | ☐ |
| E SCREEN RIGHT? | ☑ |
| DEFAULT URL? | ☐ |
| DEFAULT URL TEXT | |
| DEFAULT MESSAGE? | ☐ |
| DEFAULT MESSAGE TEXT | |
| BREADCRUMB LEVEL NUMBER* | 1 |
| BUTTON TIER NUMBER* | 1 |
| BUTTON STYLE TEXT | |
| BREADCRUMB REMOVAL TEXT | |

[ OK ]  [ CANCEL ]  [ DELETE ]

FLEXIBLE LINK MAINTENANCE SCREEN                                    1100

| HOME > FLEXIBLE MODULE > EDIT_FLEXIBLE MODULE > FLEXIBLE LINK |
| FLEXIBLE LINK |

INSERT   CANCEL

MODULE: REQU002 - REQUEST

|  | DISPLAY TEXT* | D Screen Display? | E Screen Display? | Display Order* | Link Proc? |  |
|---|---|---|---|---|---|---|
| 1105 | Edit: | Yes | No | 10 | N | Edit |
|  | Delete: | Yes | Yes | 30 | N | Edit |

FIG. 11A

INSERT   CANCEL

HOME > FLEXIBLE MODULE > EDIT_FLEXIBLE MODULE > EDIT FLEXIBLE LINK

EDIT FLEXIBLE LINK

MODULE: REQU002- REQUEST

| FLEXIBLE LINK ID* | 987 |
| MODULE* | REQUEST-(REQU002) ▼ |
| LINK DISPLAY TEXT* | Delete |
| D SCREEN DISPLAY | ☑ |
| E SCREEN DISPLAY | ☑ |
| DISPLAY ORDER* | 30 |
| LINK TEXT | |
| LINK Sql TEXT | |
| 1110 — JAVASCRIPT TEXT | veryflexibleDelete("REQUEST INN" , <T_PROMARY_ROWID/>, "Are you sure you want to delete this Record?" , "/GENKI003, .isopx, deletecode, REQU003moduleType"' D'>? |
| LINK PRIVILEGE TAG TEXT | |
| 1115 — LINK PRIVILEGE Sql TEXT | select decode ('<T_PRIMARY_ROWID/>', '', 'N', substr (get_privalege ('D', 'REQU002', '<T_PRIMARY_ROWID/>'), (, 1)) from dual union select decode ( '<T_URAT_APPLICATION_LOGIN_NAME_HR/>', USER, 'Y', 'N') from dual |
| LINK PROCEDURE TEXT | |
| DEFAULT URL? | ☐ |
| DEFAULT URL TEXT? | |
| DEFAULT MESSAGE? | ☐ |
| DEFAULT MESSAGE TEXT? | |
| BREADCRUMB LEVEL NUMBER* | 1 |
| BREADCRUMB REMOVAL TEXT | |

OK   CANCEL   DELETE

FLEXIBLE COLUMN MAINTENANCE SCREEN

HOME > FLEXIBLE MODULE > EDIT FLEXIBLE MODULE > FLEXIBLE COLUMN

| FLEXIBLE COLUMN | | | | | | | | | |
|---|---|---|---|---|---|---|---|---|---|
| MODULE: REQU002-REQUEST | | | | | | | | | |
| COLUMN NAME* | Lpdece Datatype Code* | Column Length Amount* | Primary Key? | Mandatory? | Edit?? | Hidden? | Encode? | System Maintained? | Print Order |
| ACCEPTED_FLAG_DN | Flag Field | 1 | NO | YES | YES | NO | NO | NO | 290 Edit |
| ACCEPTED_USER_DN | Character Field | 200 | NO | NO | YES | NO | NO | NO | Edit |
| BIRTHPLACE_NAME | Character Field | 50 | NO | NO | YES | NO | NO | NO | 240 Edit |
| BIRTH_DATE | Date Field | 11 | NO | NO | YES | NO | NO | NO | 230 Edit |
| CEDNCE_DIVISION_CODE | Character Field | 10 | NO | NO | YES | NO | NO | NO | 220 Edit |
| CITIZENSHIP_PROOF_FLAG | Flag Field | 1 | NO | YES | YES | NO | NO | NO | 270 Edit |
| CITY | Character Field | 50 | NO | NO | YES | NO | NO | NO | 160 Edit |
| COMPLETED_DATE_DN | Date Field | 11 | NO | NO | YES | NO | NO | NO | Edit |
| COMPLETED_FLAG_DN | Flag Field | 1 | NO | YES | YES | NO | NO | NO | 230 Edit |
| COMPLETED_USER_DN | Character Field | 200 | NO | NO | NO | NO | NO | YES | 5 Edit |
| CREATED_DATE_DN | Date Field | 11 | NO | YES | NO | NO | NO | YES | 900 Edit |
| CREATE_DESCR | Character Field | 300 | NO | NO | YES | NO | NO | NO | 260 Edit |
| CYCE_COUNTRY_CODE_CITIZENSHIP | Character Field | 10 | NO | NO | YES | NO | NO | NO | 60 Edit |
| CYCE_COUNTRY_CODE_LOCATION | Character Field | 10 | NO | NO | YES | NO | NO | NO | 290 Edit |
| CYCE_COUNTRY_CODE_SPOUSE | Character Field | 10 | NO | NO | YES | NO | NO | NO | Edit |
| DISPLAY_SPONSOR_EMAIL | Character Field | 75 | NO | NO | NO | NO | NO | YES | 124 Edit |
| DISPLAY_SPONSOR_NAME | Character Field | 75 | NO | NO | NO | NO | NO | YES | 123 Edit |
| EMAIL_ADDRESS | Character Field | 150 | NO | NO | YES | NO | NO | NO | 125 Edit |
| EMPLOYEE_NUMBER | Character Field | 15 | NO | NO | YES | NO | NO | NO | 210 Edit |
| ETSSCE_EMPLOYMENT_STATUS_CODE | Character Field | 10 | NO | NO | YES | NO | NO | NO | 190 Edit |
| FIRST_NAME | Character Field | 25 | NO | NO | YES | YES | NO | NO | 100 Edit |
| HECE_HIRE_CODE_DN | Character Field | 10 | NO | NO | YES | NO | NO | NO | Edit |
| HIRE_TEXT | Character Field | 75 | NO | NO | NO | NO | NO | YES | 10 Edit |
| IDENTIFICATION_NUMBER | Character Field | 20 | NO | YES | YES | NO | NO | NO | Edit |
| IDENTIFICATION_NUMBER_SPOSOR | Character Field | 20 | NO | NO | NO | NO | NO | YES | 122 Edit |
| IDENTIFICATION_TEXT | Character Field | 63 | NO | NO | YES | NO | NO | NO | 90 Edit |
| INNRCE_ID_NUMBER_CODE | Character Field | 10 | NO | YES | YES | NO | NO | NO | Edit |
| INNRCE_ID_NUMBER_CODE_SPONSOR | Character Field | 10 | NO | NO | NO | NO | NO | YES | 121 Edit |
| JOB_TITLE_TEXT | Character Field | 75 | NO | NO | YES | NO | NO | NO | 70 Edit |

INSERT   CANCEL

1205

HOME>FLEXIBLE MODULE > EDIT FLEXIBLE MODULE > FLEXIBLE COLUMN > EDIT FLEXIBLE COLUMN

EDIT FLEXIBLE COLUMN

[FLEXIBLE COLUMN]

MODULE: REQU002- REQUEST

| Field | Value |
|---|---|
| FLEXIBLE COLUMN ID* | 10191 |
| FEME MODULE CODE* | REQUEST-(REQU002) ▼ |
| COLUMN NAME* | LAST_NAME |
| DATABASE? | ☑ |
| UPDATE DATATYPE CODE* | Character Field ▼ |
| COLUMN LENGTH AMOUNT* | 35 |
| PRINT ORDER | 115 |

LAYOUT TABLE

| Field | Value |
|---|---|
| PRIMARY KEY? | ☐ |
| MANDATORY? | ☐ |
| EDIT? | ☑ |
| HIDDEN? | ☐ |
| ENCODE? | ☐ |
| DISPLAY TAG? | ☐ |
| DEFAULT DISPLAY Sql TEXT | |
| DISPLAY FUNCTION TEXT | |
| SYSTEM MAINTANED? | ☐ |

| Field | Value |
|---|---|
| SINGLE DISPLAY Sql TEXT | |
| LOV QUERY? | ☐ |
| LOV QUERY CODE | ▼ |
| LINK FUNCTION TEXT | |
| LINK STYLE TEXT | |
| LINK STYLE Sql TEXT | |

| Field | Value |
|---|---|
| MULTIPLE LOV Sql TEXT | |
| SELECT FUNCTION TEXT | |
| INSERT FUNCTION TEXT | |
| UPDATE FUNCTION TEXT | |
| NULL Sql TEXT | |
| COLUMN PRIVILEGE EVALUATE CODE | ▼ |
| PRIMARY KEY Sql TEXT | |

| Field | Value |
|---|---|
| COLUMN PRIVILEGE TAG TEXT | |
| EDIT PRIVILEGE Sql TEXT | |
| EDIT PRIVILEGE TAG TEXT | |

| Field | Value |
|---|---|
| COLUMN PRIVILEGE Sql TEXT | |
| DEFAULT COLUMN STYLE TEXT | |
| DEFAULT HEADER STYLE TEXT | |

[ OK ] [ CANCEL ] [ DELETE ]

FLEXIBLE COLUMN SCREEN MAINTENANCE SCREEN

HOME>FLEXIBLE MODULE>EDIT_FLEXIBLE MODULE>FLEXIBLE COLUMN>EDIT FLEXIBLE COLUMN>FLEXIBLE COLUMN SCREEN

FLEXIBLE COLUMN SCREEN

[INSERT] [CANCEL]

MODULE: REQU002 - REQUEST

| | Type* | Display text | Display? | Display order* | Layout Table | Eta? | Hover? | Sortable? | Break on Column Value | Break After Column | |
|---|---|---|---|---|---|---|---|---|---|---|---|
| 1405 | E-screen | Last Name | Yes | 115 | | No | No | No | No | No | Edit |

[INSERT] [CANCEL]

FIG. 14A

HOME>FLEXIBLE MODULE>EDIT FLEXIBLE MODULE>FLEXIBLE COLUMN>EDIT FLEXIBLE COLUMN>FLEXIBLE COLUMN SCREEN>EDIT FLEXIBLE COLUMN SCREEN

EDIT FLEXIBLE COLUMN SCREEN

MODULE: REQU002 - REQUEST

| | |
|---|---|
| COLUMN SCREEN ID* | 18434 |
| FECN FLEXIBLE COLUMN ID* | (10191) - LAST_NAME |
| TYPE* | E-SCREEN ▼ |
| DISPLAY TEXT | Last Name |
| DISPLAY LENGTH AMOUNT* | 35 |
| COLUMNS TO SPAN NUMBER* | 1 |
| DISPLAY? | ☑ |
| DISPLAY ORDER* | 115 |
| LAYOUT TABLE | ▼ |
| LAYOUT ROW NUMBER | |
| LAYOUT COLUMN NUMBER | |
| FIELD TAG TEXT | |
| FIELD TAG STYLE TEXT | |
| FIELD STYLE Sql TEXT | |
| ETA? | ☐ |
| ETA MAX COLUMN AMOUNT | |
| ETA MIN ROW AMOUNT | |
| HOVER? | ☐ |
| HOVER MAX COLUMN AMOUNT | |
| SORTABLE? | ☐ |
| BREAK ON COLUMN VALUE? | ☐ |
| BREAK ON COLUMN HTML TEXT | |
| BREAK AFTER COLUMN? | ☐ |
| BREAK AFTER COLUMN HTML TEXT | |

[OK] [CANCEL] [DELETE]

FIG. 14B

FLEXIBLE LAYOUT MAINTENANCE SCREEN

HOME > FLEXIBLE MODULE > EDIT FLEXIBLE MODULE > FLEXIBLE LAYOUT

FLEXIBLE LAYOUT

MODULE: REQU002 - REQUEST

1500

| Display Order* | MAX Row Number* | Max Col Number* | Layout Justification Text | Layout Html Style Text | Layout Sql Style Text |
|---|---|---|---|---|---|
| | | | INSERT  CANCEL | | |
| | | | INSERT  CANCEL | | |

FIG. 15A

HOME > FLEXIBLE MODULE > EDIT FLEXIBLE MODULE > FLEXIBLE LAYOUT > EDIT FLEXIBLE LAYOUT

EDIT FLEXIBLE LAYOUT

MODULE: REQU002 - REQUEST

LAYOUT TABLE ID*
FEME MODULE CODE*   REQUEST(REQU002)
DISPLAY ORDER*
MAX ROW NUMBER*
MAX COLUMN NUMBER*
LAYOUT JUSTIFICATION TEXT   ⟨⟩
LAYOUT HTML STYLE TEXT   ⟨⟩
LAYOUT Sql STYLE TEXT

OK   CANCEL

FIG. 15B

LOOKUP DATA TYPE CODE MAINTENANCE SCREEN

HOME > LOOKUP DATA TYPECODE

LOOKUP DATATYPE CODE

| DATATYPE CODE* | DESCRIPTION | DATATYPE GROUP CODE* | SUMMARIZE ON? | START DATE* | ACTIVE? | |
|---|---|---|---|---|---|---|
| ASOFDATE | As-Of Date Field | DATE, ASOFDATE | NO | 14-FEB-06 | ACTIVE | EDIT |
| CHAR | Character Field | CHAR,FLAG, ROWID, KEYWORD | YES | 14-FEB-06 | ACTIVE | EDIT |
| COUNT | Count Field | NUMBER | YES | 14-FEB-06 | ACTIVE | EDIT |
| DATE | Date Field | DATE, ASOFDATE | YES | 14-FEB-06 | ACTIVE | EDIT |
| EXTLINK | External Link | LINK | NO | 19-JAN-08 | ACTIVE | EDIT |
| EXTLINKPRO | External Link Promp | LINKPROMT | NO | 19-JAN-08 | ACTIVE | EDIT |
| FLAG | Flag Field | CHAR,FLAG, ROWID, KEYWORD | YES | 14-FEB-06 | ACTIVE | EDIT |
| FY | Fiscal Year Field | FY | YES | 14-FEB-06 | ACTIVE | EDIT |
| KEYWORD | Keyword Search | CHAR,FLAG, ROWID, KEYWORD | YES | 14-FEB-06 | ACTIVE | EDIT |
| LINK | Link | LINK | NO | 14-FEB-06 | ACTIVE | EDIT |
| LINKPROMT | Link Display Prompt | LINKPROMT | YES | 14-FEB-06 | ACTIVE | EDIT |
| MONEY | Money Field | MONEY | YES | 14-FEB-06 | ACTIVE | EDIT |
| NUMBER | Numeric Field | NUMBER | NO | 14-FEB-06 | ACTIVE | EDIT |
| RANGEDATE | Date Range Field | DATE, ASOFDATE | NO | 14-FEB-06 | ACTIVE | EDIT |
| ROWID | Rowid Field | CHAR,FLAG, ROWID, KEYWORD | | 14-FEB-06 | ACTIVE | EDIT |

1605

OK    CANCEL

SYSTEMS AND METHODS FOR GENERATING AN INTERACTIVE USER INTERFACE FROM A DATABASE

RELATED APPLICATIONS

This application claims the benefit of priority from U.S. Provisional Patent Application No. 62/026,155, filed Jul. 18, 2014, which is incorporated herein by reference in its entirety.

TECHNICAL FIELD

Various embodiments of the present disclosure relate generally to generating user interfaces. More specifically, particular embodiments of the present disclosure relate to systems and methods for generating a user interface from a data store.

BACKGROUND

Typically, creating new user interfaces for software applications or online publishing requires new source code to be written by software developers. In a software application, for example, a user interface would be designed, and a trained developer would write source code that renders user interface objects on a display and allows user interaction according to the intended functionality. In online publishing of web pages, when a web page is accessed, a user interface may be written in a static markup language or a dynamic language that renders markup language. In either case, source code is written that causes the user interface to be rendered and behave in the desired manner.

Writing source code is time consuming and expensive due to the need to use highly-skilled programmers. Updating source code is also a challenge, since the code can be lengthy and difficult for even skilled programmers to interpret.

SUMMARY OF THE DISCLOSURE

Embodiments disclose systems and methods for generating a user interface from a data store.

According to certain embodiments, computer-implemented methods are disclosed for generating interactive user interface pages from a data store. At least one method comprises receiving at least a portion of metadata from a data store, wherein the appearance and functionality of a plurality of interactive user interface pages is based on the metadata; generating the display and functionality of an interactive maintenance page based on at least a portion of the metadata, wherein the interactive maintenance page is one of the plurality of interactive user interface pages, and wherein the interactive maintenance page maintains the plurality of interactive user interface pages; receiving one or more instructions from the interactive maintenance page; updating the metadata based upon the one or more instructions; and modifying the appearance and functionality of at least one of the interactive user interface pages and/or the interactive maintenance page based on the metadata.

According to certain embodiments, systems are disclosed for generating interactive user interface pages from a data storage device. At least one system includes a data storage device storing instructions for generating interactive user interface pages in a network environment; and a processor configured to execute the instructions to perform a method including: receiving at least a portion of metadata from the data storage device, wherein the appearance and functionality of a plurality of interactive user interface pages is based on the metadata; generating the display and functionality of an interactive maintenance page based on at least a portion of the metadata, wherein the interactive maintenance page is one of the plurality of interactive user interface pages, and wherein the interactive maintenance page maintains the plurality of interactive user interface pages; receiving one or more instructions from the interactive maintenance page; updating the metadata based upon the one or more instructions; and modifying the appearance and functionality of at least one of the interactive user interface pages and/or the interactive maintenance page based on the metadata.

According to certain embodiments, a computer readable medium is disclosed as storing instructions that, when executed by a processor, cause the processor to perform a method for generating interactive user interface pages from a data store, the method including: receiving at least a portion of metadata from the data storage device, wherein the appearance and functionality of a plurality of interactive user interface pages is based on the metadata; generating the display and functionality of an interactive maintenance page based on at least a portion of the metadata, wherein the interactive maintenance page is one of the plurality of interactive user interface pages, and wherein the interactive maintenance page maintains the plurality of interactive user interface pages; receiving one or more instructions from the interactive maintenance page; updating the metadata based upon the one or more instructions; and modifying the appearance and functionality of at least one of the interactive user interface pages and/or the interactive maintenance page based on the metadata.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 illustrates an exemplary user interface page displaying content from a data store, according to an embodiment of the present disclosure.

FIG. 3 illustrates an exemplary user interface page displaying content from a data store, according to an embodiment of the present disclosure.

FIG. 5 illustrates an exemplary user interface page that functions as a maintenance display, according to an embodiment of the present disclosure.

FIG. 7 illustrates an exemplary user interface page that functions as a edit flexible filter detail display, according to an embodiment of the present disclosure.

FIGS. 8a and 8b illustrate exemplary user interface pages that function as a flexible title maintenance display and edit, according to an embodiment of the present disclosure.

FIG. 10 illustrates an exemplary user interface page that functions as a edit flexible button maintenance display, according to an embodiment of the present disclosure.

FIGS. 11a and 11b illustrate exemplary user interface pages that function as flexible link maintenance display and edit, according to an embodiment of the present disclosure.

FIG. 12 illustrates an exemplary user interface page that functions as a flexible column maintenance display, according to an embodiment of the present disclosure.

FIG. 13 illustrates an exemplary user interface page that functions as an edit flexible column maintenance display, according to an embodiment of the present disclosure.

FIGS. 14a and 14b illustrate exemplary user interface pages that function as flexible column screen maintenance display and edit, according to an embodiment of the present disclosure.

FIGS. 15a and 15b illustrate exemplary user interface pages that function as flexible layout table maintenance display and edit, according to an embodiment of the present disclosure.

FIG. 16 illustrates an exemplary user interface page that function as a lookup data type code maintenance display, according to an embodiment of the present disclosure.

DESCRIPTION OF THE EMBODIMENTS

Figure 1:
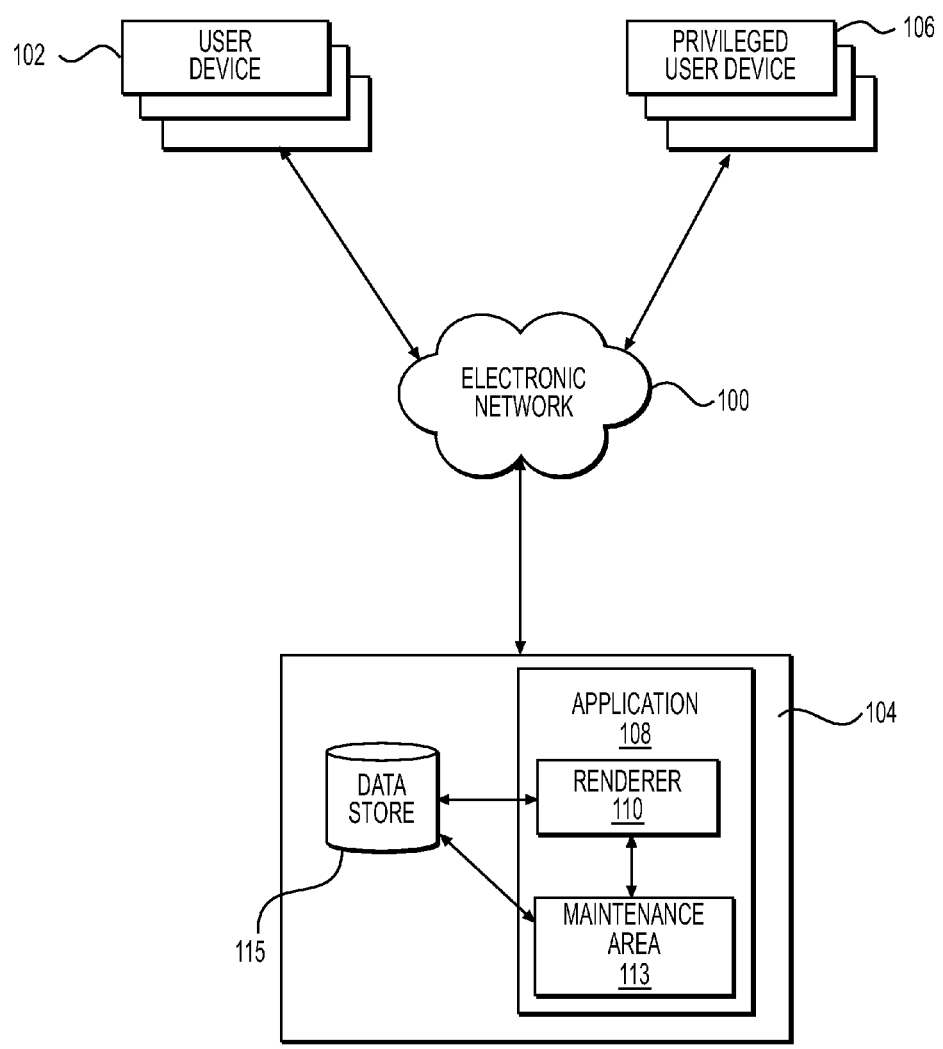
FIG. 1 is a schematic diagram of a network environment for generating user interface pages from a data store, according to an embodiment of the present disclosure.

While the present disclosure is described herein with reference to illustrative embodiments for particular applications, it should be understood that embodiments of the present disclosure are not limited thereto. Other embodiments are possible, and modifications can be made to the described embodiments within the spirit and scope of the teachings herein, as they may be applied to the above-noted field of the present disclosure or to any additional fields in which such embodiments would be of significant utility.

In view of the challenges associated with the conventional techniques outlined above, systems and methods are disclosed herein for processing and displaying user interface pages generated from a data store. Embodiments included herein may comprise a software application for creating and editing database records, although techniques herein would apply towards any application that uses graphical user interfaces, or interactive displays, also referred to as user interface pages.

In an embodiment, a privileged user may easily create, modify and delete user interface pages using at least one user interface page. User interfaces pages may further be created, modified and deleted by creating, modifying and deleting metadata in a data store, such as a database. User interfaces may be created, modified, and deleted, for example, in one or more maintenance pages displayed by the software application. Maintenance pages may provide the ability for an individual with minimal training to create complex, dynamic user interfaces that use rules and conditional logic. Further, such new interfaces may be created without the creation or generation of any new source code. Maintenance pages themselves may also be created, modified, or deleted using maintenance pages. As a result, metadata-generated pages may be created by user interfaces which are themselves metadata-generated. As a result, complex software applications may be developed and self-maintained by modifying a data store, without the involvement of highly trained software developers, and without requiring the creation or editing of source code, all of which saves substantial time and money.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a schematic diagram of a network environment for generating user interface pages from a data store, according to an embodiment of the present disclosure. As shown in FIG. 1, the environment may include one or more users using user devices 102, which may be communicatively coupled to a server system 104 via an electronic network 100. One or more privileged user devices 106 may be used by privileged users in order to gain levels of additional access to one or more maintenance pages in a maintenance area 113, as discussed above. Electronic network 100 may include one or a combination of wired and/or wireless electronic networks. Network 100 may also include a local area network, a medium area network, or a wide area network, such as the Internet.

In one embodiment, each user device 102 and 106 may be any type of computing device configured to send and receive different types of content and data to and from various computing devices via network 100. Examples of such a computing device include, but are not limited to, a desktop computer or workstation, a laptop computer, a mobile handset, a personal digital assistant (PDA), a cellular telephone, a network appliance, a smart phone, or any combination of these or other types of computing devices having at least one processor, a local memory, a display (e.g., a monitor or touchscreen display), one or more user input devices, and a network communication interface. The user input device(s) may include any type or combination of input/output devices, such as a keyboard, touchpad, mouse, touchscreen, camera, and/or microphone.

In one embodiment, each of the user devices 102 and 106 may be configured to execute a software application 108, for example, via a web browser or browser installed for displaying various types of content and data received from any of server systems 104 via network 100. Server systems 104 in turn may be configured to receive user-generated content, e.g., in the form of data or metadata, from user devices 102 over electronic network 100. The data may be submitted by a user at each device 102 through an interface provided on a web page loaded within the browser executable at each device. Alternatively, application 108 may be accessed and executed locally, rather than via electronic network 100.

While user devices 102 and privileged user devices 106 are shown separately in FIG. 1, it should be noted that a single type of user device may be used by both regular users and privileged users. Further, while server system 104 is depicted as a single system or device, it should be noted that renderer 110, data store 115, maintenance area 113, and any other components described herein may be implemented using two or more server devices or systems. In an example, a single server 104 may be a web server that is configured to provide different versions of a web page and associated content to different user devices 102 and 106 according to user identity, the type of device, or type of web browser executable at the device, etc. The different versions of the web page may include, for example, a desktop version and a mobile version, for which the web page content may be formatted appropriately for display via the particular type of browser at the device. Further, any of the functionality of server system 104 may be operated by a single administrative entity, or outsourced to one or more other entities, such as a web hosting entity, web storage entity, and/or cloud computing service, possibly disposed remotely of each other.

Also, as shown in FIG. 1, server system 104 may include one or more data stores, such as databases 115. In an embodiment, data store 115 may be any type of data store or recording medium that may be used to store any type of data including, for example, user data, software application data, user display data, administration data, etc. While a single data store 115 is shown in FIG. 1, data and metadata may be stored across any number of data storage devices, including in cloud or remote storage devices. In an embodiment, renderer 110 may be configured to receive user input from one or more of user devices 102 and 106 and store the received input within data store 115. In some implementations, any received data may be stored in the data store 115 in an encrypted form to increase security of the data against unauthorized access.

As shown in the example of FIG. 1, application 108 may include a renderer 110. In an embodiment, renderer 110 may be configured to render user interface pages using data and metadata retrieved from at least one data store 115, where the user interface pages rendered may include maintenance pages associated with the maintenance area 113. Rendering system 110 may also be configured to process data from data store 115 based on metadata from data store 115 to create and display interactive user interface pages further based on rules and/or conditional logic, which may be user-determined. The rendering rules and/or conditional logic may be stored in metadata in the data store 115, allowing static and/or dynamic features of the application 108 to be added, updated, or deleted without modification of the source code, without compilation, and without requiring testing of the source code.

FIG. 2 illustrates an exemplary display user interface page 200 from application 108 displaying data from data store 115, according to an embodiment of the present disclosure. While FIG. 2 shows an example display page of a user application that may be created using the maintenance area 113 and renderer 110, it should be understood that any software application using graphical user interfaces may be generated with techniques presented herein. Display user interface page 200 may, for example, display a series of records 203 retrieved from a data store 115. Records 203 and/or other application data may be viewed and/or modified by privileged and/or unprivileged users. Rules and/or conditions stored in metadata from data store 115 may determine which records 203 and other user interface elements are displayed. More generally, metadata may at least partially determine the appearance and/or behavior and functionality of any user interface page in application 108. User interface pages of application 108 may be generated based upon the metadata. User interface elements displayed may also vary by date, time, user identity, and/or navigation path used to reach the display user interface page 200, etc., according to the rules and/or conditions stored in the metadata. Breadcrumb 205 may display the navigation path taken to reach the page. Filter fields 220 may be displayed according to rules and/or conditions, and may allow a user to narrow the records 203 displayed by selection of one or more filters. User interface buttons 210, and row edit links 215, may also be displayed according to rules and/or conditions contained in metadata. For example, row edit links 215 may be displayed only for users with sufficient access privileges.

Row edit links 215 may be selected by a user, which may cause the page to navigate to an edit user interface page, and/or additional user interface elements may be displayed. FIG. 3 illustrates an exemplary edit user interface page 300 for displaying content from a data store 115 associated with an individual database record. Users may modify record fields 305 in order to update or delete the record. Each record field 305 may be of a particular data type, which may be set in the metadata. Each record field may be rendered according to its data type, or may be set in metadata regardless of data type. For example, program name record field 310 may be set to be a drop down list, and thus a drop down arrow may be automatically rendered. Proposed start date record field 315 may be set to be a date field, and a date icon may be automatically rendered. Any and all user interface elements displayed may also vary by date, time, user identity, and/or navigation path used to reach the edit user interface page 300, etc., which may be set in metadata stored in data store 115. Additional record fields may be accessed for modification by selecting additional user interface buttons 307.

Figure 4:
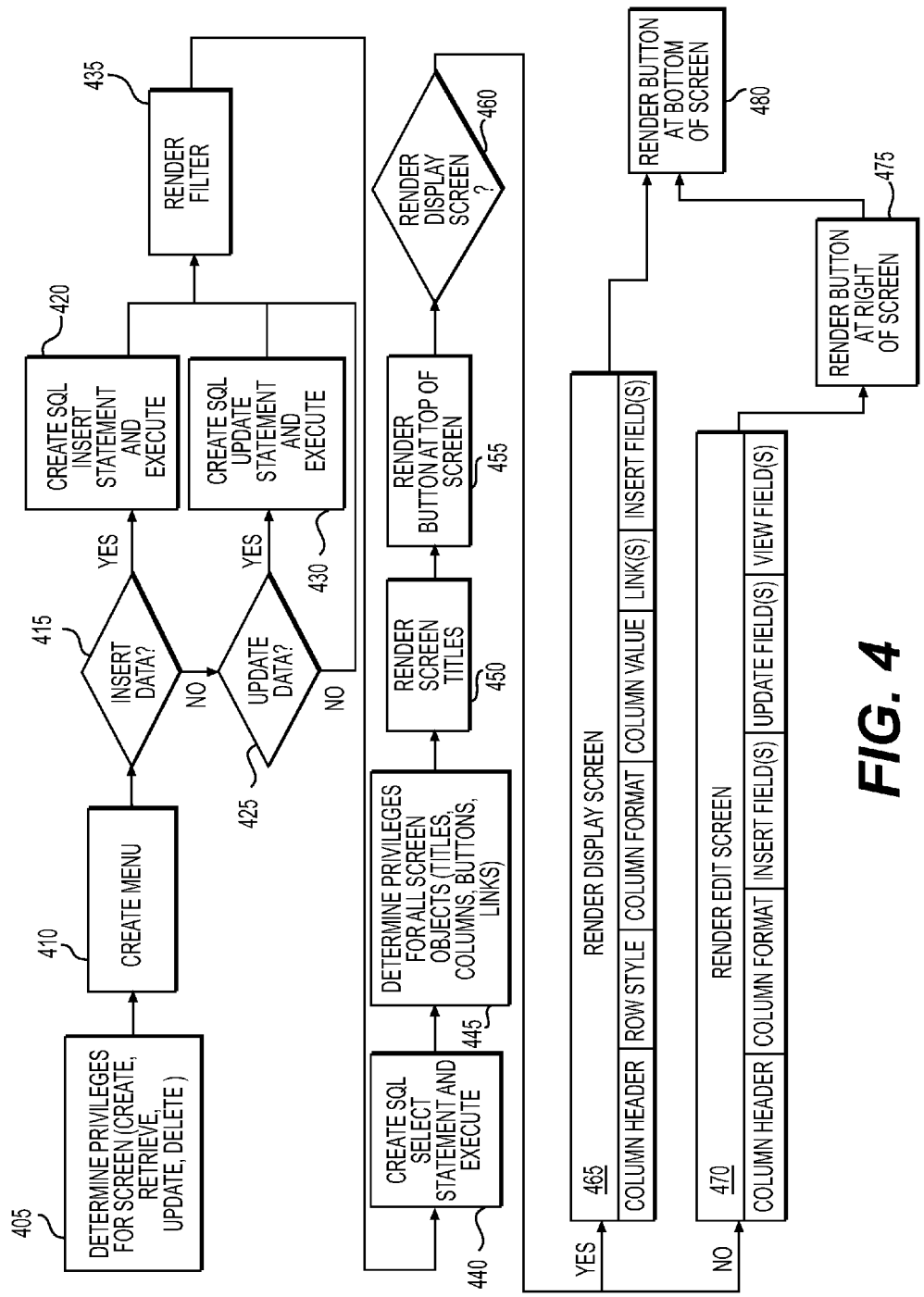
FIG. 4 is a flow diagram of an exemplary method for rendering one or more user interface elements on a user interface page, according to an embodiment of the present disclosure.

FIG. 4 is a flow diagram of an exemplary method for rendering a user interface page, such as the display user interface page 200 or the edit user interface page 300. At step 405, user privileges may be determined for the user interface page, which may affect which user interface elements are displayed and enabled. For example, create, retrieve, update, and delete capabilities may be enabled and rendered. At step 410, a menu may be created. At step 415, if data is to be inserted, at step 420, a database command such as an Structured Query Language ("SQL") INSERT statement may be generated and executed. Data may also be updated at 425, in which case at 430, a database command such as an SQL UPDATE statement may be generated and executed. At step 435, a filter, such as filter fields 220, may be rendered based on data and/or metadata. At step 440, an SQL SELECT statement may be created and executed, which may return any number of data records from the data store 115 for display. At step 445, user privileges for user interface objects or elements such as titles, columns, buttons and links may be determined. User privileges may determine what user interface objects are displayed, and how they are displayed. At step 450, one or more user interface titles may be rendered. At step 455, one or more buttons may be rendered, such as at the top of the page 210.

If a display user interface page 200 is to be rendered, as may be determined at step 460, this rendering may be performed, as described, at step 465. Alternatively, if an edit user interface page 300 is to be rendered, this rendering may be performed, as described, at step 470. User interface pages

200 and 300 may have differing user interface elements to display, including additional buttons, as described at step 475. At step 480, any additional user interface elements such as buttons at the bottom of the page, may be rendered.

For the user interface elements rendered in FIG. 4, default or user-determined rules and/or conditional logic may be determined from metadata that affect which elements are displayed, and the manner in which they are displayed. While a particular order of rendering a user interface is shown in FIG. 4, namely top-down, the steps taken to render a user interface may be performed in nearly any order, including bottom-up, by element type, etc.

FIG. 5 illustrates an exemplary user interface page that acts as a maintenance page, according to an embodiment of the present disclosure. As discussed above, maintenance area 113 may be used to create, modify, and delete user interface pages and user interface elements. The maintenance area may be presented as single user interface page, or broken up into a plurality of interface pages, as shown in FIGS. 5-16. Maintenance page 500 may act as a maintenance home page, from which tables containing metadata used to render user interface pages of the application 108 may be viewed and modified. As a result, the appearance and/or functionality of one or more user interface pages in application 108 may be modified in the maintenance area 113 by modifying metadata, such as metadata stored in data store 115. Additional maintenance pages may be accessed if the user selects one of buttons 505, as will be discussed below in relation to FIGS. 6-16.

As discussed above, metadata stored in data store 115 may determine the appearance and behavior, including interactive behavior, of user interface pages of the application 108, including of the maintenance area 113. This metadata may be stored in tables of a relational database, for example, and may be modified by one or more users. Table name field 507 may display the name of the table currently being viewed in the maintenance page 500. As discussed above, the application may comprise display pages and edit pages. D Screen Title field 510 and E Screen Title field 515 allow a user to set the titles of the display and edit pages, respectively. At Insert on Screen field 520, as user may designate in a flag whether the users of the application will be able to insert new data on the display user interface page 200, or if the user will instead have to navigate to the edit user interface page 300. The Where Clause Text field 525 allows the user to designate filters applied to narrow the number of records displayed on display user interface page 200. The Order By Clause Text field 530 may allow a user to designate an order of fields by which records displayed on display user interface page 200 will be sorted.

The Additional Privilege SQL text field 535 may be a database request such as a SELECT statement, that dynamically gets privileges and determines which actions a user may perform on the user interface page. The display of the associated user interface page may also change based upon determined privileges. For example, "U" may indicate that a certain user has update privileges, and hence the ability to update the data being displayed on the page. Filter Query field 540 indicates whether the display user interface page 200 should automatically query when the user first opens the page. Filter Button Text field 545 may indicate the text to be displayed for the button, located near or on the filter fields 220, to limit the data displayed based on user-selected values in filter fields 220. Multiple Selection field 550 designates whether the user is able to select multiple filter criteria on the display user interface page 200. Row Tag Text 555 may identify one or more data fields in the row that will be evaluated to determine the format for the row of data displayed on the page. Row Tag Style Text 560 may indicate instructions, such as HTML instructions, that set the format or style for the row of data displayed on the page based on the row tag. As an example, Row Tag Text may be set to an "Amount" field, such that when the value of the Amount field is positive, the field and/or row displaying the value will be highlighted. Conversely, if the Amount field is negative, the field and/or row displaying the value will be highlighted in some other manner.

Row Style SQL text 565 indicates the format or style for the row data displayed on the page based on the execution of an SQL query. For example, the field may contain an SQL statement that references data displayed on the associated user interface page, any data that is accessible to the user in data store 115, and/or any information accessible within the data store 115 such as user privileges, date, etc. For example, the SQL statement "select 'color:red' from dual" may cause the associated row in the user interface page to be indicated, such as by highlighting the row red. Other styles may be changed with the Row Style SQL text field, such as text color, highlight color, font style such as bold or italics, etc.

Row Style Text 570 indicates the format or style for the row of data displayed on the page. For example, the user may define a static background color for the row. Row Style Mod Number 575 indicates the number of the row(s) on which to apply the row styling on the page. For example, a "2" may indicate that a defined background color would be applied to every other row in the display user interface page 200.

The Perfunctory Display SQL Text field 591 may comprise a user-defined SQL SELECT statement that executes at the beginning of the rendering of the display user interface page 200 or edit user interface page 300. This SQL statement may set values for one or more variables to dynamically control the display and functionality of user interface objects to the user. For example, the SQL statement may set the value of Java variables referenced in one or more other fields for user interface objects, such as a column, button, link, filter, etc. For example, the code "select user from dual" may identify the specific user for which the user interface page is being displayed. The resulting value may then be used to determine the user interface objects that will be displayed to the user and, in addition, may be used control the behavior of those interface objects.

The Perfunctory Insert SQL Text field 593 may comprise a user-defined SQL SELECT statement that executes at the beginning of the rendering of the display user interface page 200 or edit user interface page 300. This SQL statement may set values for one or more variables to control the display of user interface objects to the user. For example, the SQL statement may execute one time and may set the value of Java variables referenced in one or more other fields for user interface objects such as a column, button, link, filter, etc. For example, the code "select round(<T_NUMBER/>) from dual" may round the value of a number field received from the user interface page to the nearest integer value (e.g. "4.6" would be rounded up to 5, etc.), and insert the resulting integer into the data store.

The Perfunctory Update SQL Text field 595 may comprise a user-defined SQL SELECT statement that executes at the beginning of the rendering of the edit user interface page 300. This SQL statement may set values for one or more variables to control the display of user interface objects to the user. For example, the SQL statement may set the value of Java variables referenced in one or more other fields for user interface objects such as a column, button, link, filter, etc. For example, the code "select round(<T_NUMBER/>) from dual" may round the value of a number field received from the data store to the nearest integer value (e.g. "4.6" would be rounded up to 5, etc.), and update the resulting integer in the data store.

As discussed in the Row Style Text 570 example above, static data such as background color may be used to render a user interface page. Dynamic conditions may also be inserted in fields to control the rendering of user interface elements. For example, the Row Style SQL text field 565 may be used to define dynamic SQL conditions which are determined at the time of the rendering of the user interface page. Conditions may be based upon the date, time, user identity, data values internal or external to the application, etc. For example, the user's identity may determine whether certain fields are displayed, or how they are displayed on the user interface page, based on the permissions associated with the user or type of user. The user interface page may even be rendered based upon a navigation path, such as the navigation path taken by the user in the application 108 to reach the maintenance area 113, or to reach the specific user interface page being displayed. Both static data and dynamic conditions may be stored in metadata in data store 115, and may be modified by an authorized user at any time. Further, static data and dynamic conditions may be based upon data and metadata associated with other user interface pages.

Break fields 580 through 589 in FIG. 5 may control the way data is grouped when being displayed to the user. These data groupings may be called "break groups." Break group information may be applicable for any user interface display which displays more than one data record.

The Break Data Code field 580 may indicate whether displayed data is broken into groups by a column value (COL), or based on the number of rows of data (ROW). If the Break Data code field value is ROW, then the value for Break Data by Row Mod Number (Row Modulus Number) field 585 may determine the number of rows that are in each group. Further, if the Break Data Code field 580 is ROW, then the Break Data by Row Rem Number field 587 (Row Remaining Number) may determine the minimum number of rows of data that can be in each group. For example, the Break Data by Row Mod Number field 585 may be set to "7" and the Break Data by Row Rem Number field 587 may be set to "3". If there are 20 rows of data to display on the user interface page, the 20 rows may be broken into 3 groups, 2 groups of 7 rows, and 1 group for the remaining 6 rows. Alternatively, if there were 23 rows of data, the rows will be broken into 3 groups, 2 groups of 7 rows and the last group 9 rows. Although the typical group max is 7 rows, a group of 9 may be allowed in this case because the overflow of 2 rows is less than the Break Data by Row Rem Number field value of 3.

If the Break Data Code field 580 is COL, information from the Flexible Column Screen may be used to create groups of data. All groups may be ordered alphabetically (for example, based on the column value(s)) and displayed on the user interface page.

The Break by Row HTML field 589 indicates the separator that is used between groups of data. This may be HTML text that creates a line between groups of data, although other types of dividers are possible. For example, the field value may be "<div style='border-bottom:dotted;'>", which would create a dotted line along the bottom of each group.

Other dynamic fields may be included that impact the dynamic display of screen titles, the dynamic functionality of user interface pages, and the ordering of data displayed on user interface pages.

As discussed above, the maintenance page 500 may allow a user to modify a software module of the application 108, where the software module may be associated with a user interface page. This may include the ability to manipulate any software module, including the maintenance area 113 itself. Put another way, the maintenance area 113 may be self-modifiable. For example, a user may be able to set one or more variables, fields, rules, and/or conditions in order to control the rendering of the maintenance page 500. Thus, the maintenance page 500 may be used to dynamically modify the appearance of the maintenance page 500 itself. The maintenance page 500 may also modify multiple user interface pages simultaneously, such as, for example, the maintenance page 500 itself, and simultaneously one or more other user interface pages in the application 108. Upon modification, the maintenance page 500 may dynamically refresh to reflect the one or more modifications.

Figure 6:
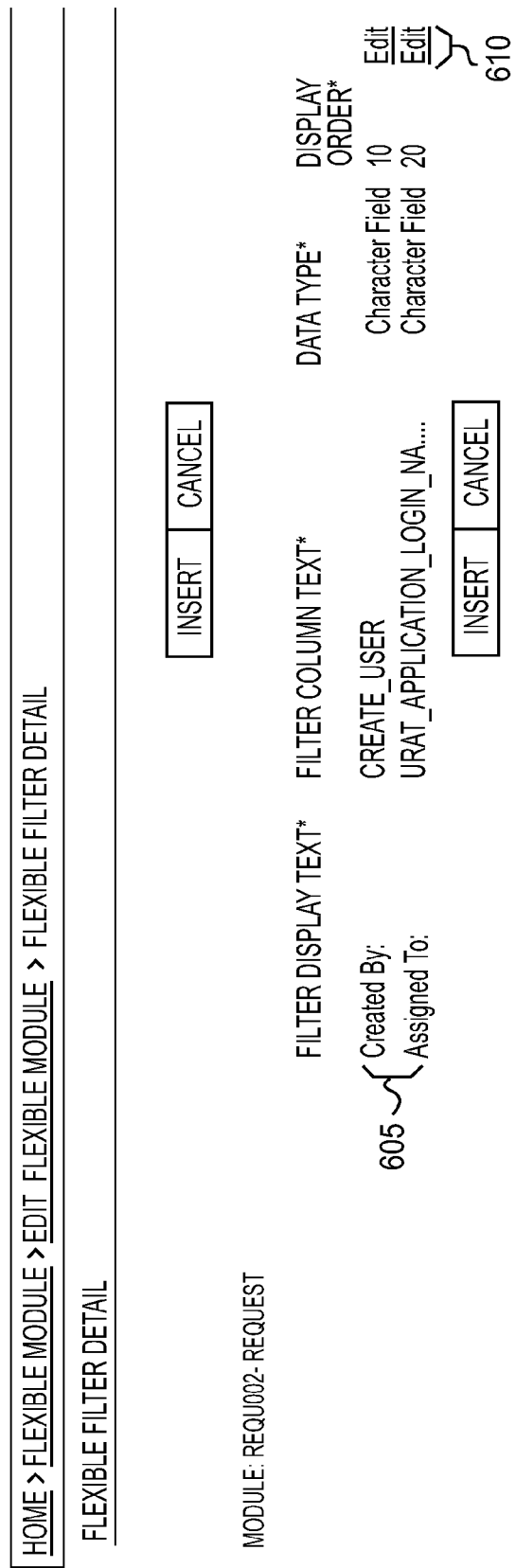
FIG. 6 illustrates an exemplary user interface page that functions as a flexible filter display, according to an embodiment of the present disclosure.

As discussed above, the maintenance area 113 may comprise a single user interface page, or a series of user interface pages. Other user interface pages in the maintenance area, such as those shown in FIGS. 6-16, may be accessible by buttons 505. FIG. 6 illustrates an exemplary user interface page 600 which allows modification of filter fields 220, according to an embodiment of the present disclosure. Any number of filter fields may be designated, and the contents and appearance of filter fields may be modified, for example, by selecting edit link 610 for the corresponding filter field record 605.

The edit link 610 may direct a user to the associated filter detail display 700, as shown in FIG. 7. In the filter detail display 700, a user may be able to modify a variety of attributes of a given filter field, for example, a filter field from the filter fields 220. The user may also define dynamic conditions, such as in SQL, regarding the population of a filter drop down list box, at Filter Ddlb SQL Text 705.

FIGS. 8a and 8b illustrate exemplary user interface pages that function as a flexible title maintenance display and edit, according to an embodiment of the present disclosure. Fields 805 in FIG. 8a list titles for various user interface pages in the application 108. If the user selects a title, the edit title page shown in FIG. 8b may be displayed. The edit title page allows a user to designate fields, such as the page associated with the title object 810, the print order 815, and dynamic rules and conditions associated with the display of the title 820.

Figure 9:
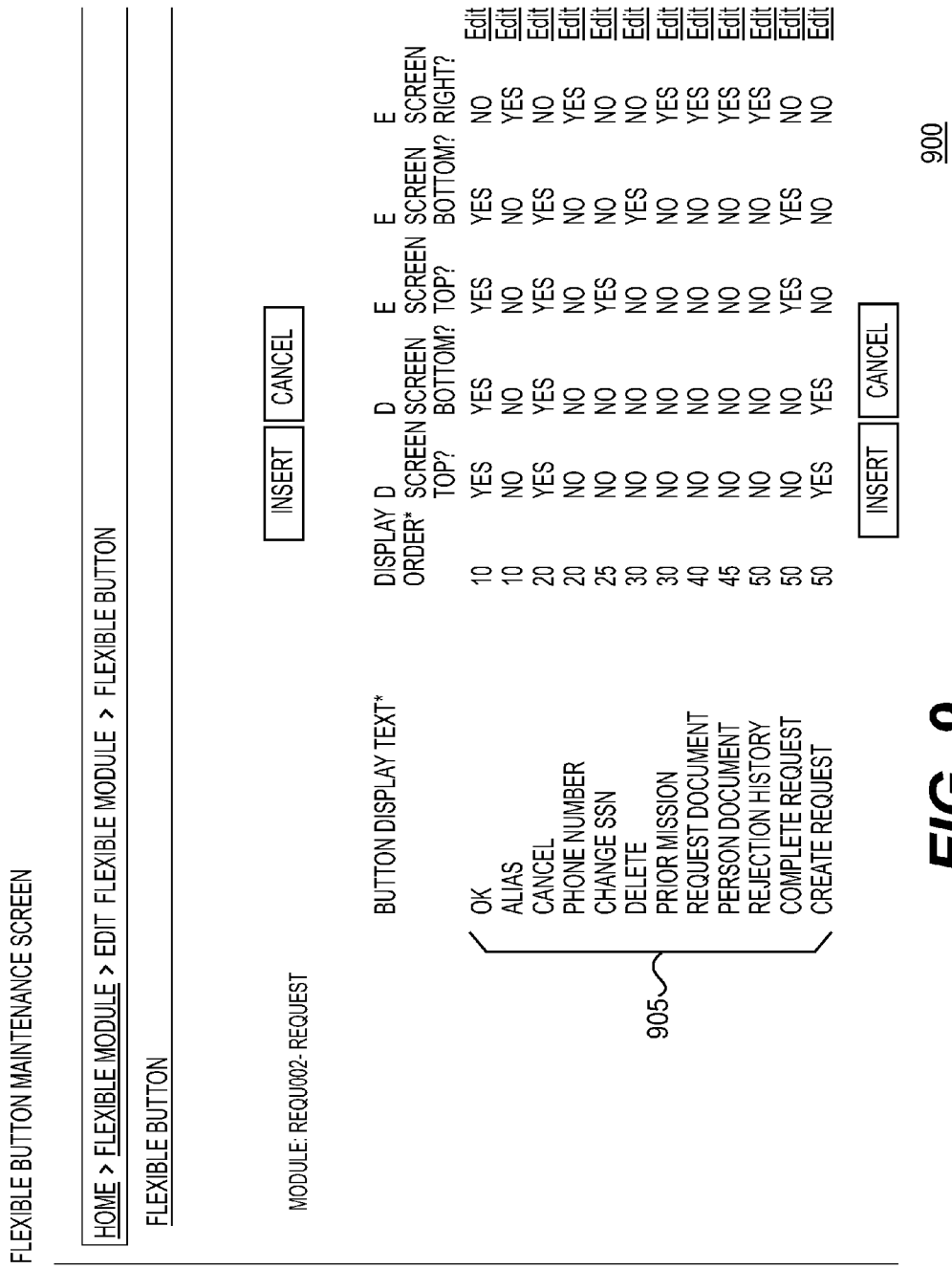
FIG. 9 illustrates an exemplary user interface page that functions as a flexible button maintenance display, according to an embodiment of the present disclosure.

FIG. 9 illustrates an exemplary user interface page that functions as a flexible button maintenance user interface 900, according to an embodiment of the present disclosure. The display may list button records 905 associated with one or more user interfaces of the application 108. A user may select to edit an individual button record, whereupon the page will redirect to the edit flexible button maintenance page 1000, as shown in FIG. 10. Fields in the edit flexible button maintenance page 1000 allow a user to designate the display order, screen placement, breadcrumb order, default display parameters, links, and privileges of buttons associated with various user interface pages of the application 108. For example, Button Link Text 1005 may indicate the link to be followed for the button displayed on the user interface page. Button Link SQL text 1007 may include a code snippet, such as SQL, that is executed in order to dynamically determine the button's link or universal resource locator ("URL"), which may incorporate conditions or rules.

Button Procedure Text 1010 may indicate a method or procedure name to be called when the button is selected, while JavaScript Text 1013 may list JavaScript or other scripting language commands to be executed when the button is selected. Button Privilege SQL Text 1015 may comprise SQL or other code snippets that cause user privileges to be determined. This may, for example, cause a button to be invisible for certain users, and visible for others.

FIGS. 11*a* and 11*b* illustrate exemplary user interface pages 1100 that function as flexible link maintenance display and edit, according to an embodiment of the present disclosure. Link records 1105 may each correspond to links for records in a user interface display, such as edit links 215. Upon selecting a link record 1105, the page may navigate to an edit flexible link page, as shown in FIG. 11*b*. On the edit flexible link page, a user may be able to change the link text, pages where the link is displayed, display order, breadcrumb level, etc. The JavaScript Text field 1110 indicates JavaScript commands to execute when the link is clicked by a user on the page. The JavaScript may statically and/or dynamically determine text that may be displayed if a user selects the link in the application 108. The Link Privilege SQL Text field 1115 may contain instructions that allow determining if the user identity and/or type are such that the link will be displayed.

FIG. 12 illustrates an exemplary user interface page that functions as a flexible column maintenance display page 1200, according to an embodiment of the present disclosure. The flexible column maintenance display page 1200 may allow a privileged user to change the definition, appearance and behavior of fields across the application 108. Column records 1205 indicate fields that appear in various user interface pages of application 108. Upon selecting an individual column record 1205, the page may navigate to an edit flexible column maintenance display page 1300, as shown in FIG. 13. The edit flexible column maintenance display page 1300 allows a user to set display order, field text, field type, link values, privilege requirements to view, and other values for fields displayed in the application 108.

The flexible column maintenance display page 1300 may further allow a privileged user to designate interaction with data sources by designating a column name and/or database. Display fields may be added, updated, and deleted that at least partially determine the functionality of at least one user interface page, for example, an Update Datatype Code, a Column Length Amount, a primary key, whether the field is mandatory, an Edit link, whether a field is hidden, whether a field is encoded, whether the column value is maintained by the system, a List of Values (LOV) query, a LOV Query Code, a Link Function Text, Multiple LOV SQL Texts, an Update Function Text field, a NULL SQL Text field, a Column Privilege Evaluate Code field, a Primary Key SQL Text field, a Column Privilege Tag Text field, an Edit Privilege SQL Text field, and an Edit Privilege Tag Text field.

The flexible column maintenance display page 1300 may also allow a privileged user to designate information to control the display of the field on the page, such as by designating a Print Order field, Layout Table field, Display Tag field, Default Display SQL text field, Display Function Text field, Single Display SQL Text field, Link Style Text field, Link Style SQL Text field, Select Function Text field, Column Privilege SQL Text field, Default Column Style Text field, and/or a Default Header Style Text field.

The flexible column maintenance display page 1300 may also allow a privileged user to designate field prompt names and field display length, whether a field is displayed to a user, display order, layout table positioning, field styling, extended text area information, hover and tool tip information, whether data is re-sortable by the user, and/or break group information.

FIGS. 14*a* and 14*b* illustrate exemplary user interface pages 1400 that function as flexible column screen maintenance displays, according to an embodiment of the present disclosure. Column records 1405 list columns displayed on user interface pages in application 108. A column record 1405 may be selected, causing the page to navigate to the edit flexible column screen maintenance display page, as shown in FIG. 14*b*. User interface designation, column text, display parameters, etc. may all be indicated by a user in order to configure the appearance and/or behavior of each column in the user interface pages of the application 108.

FIGS. 15*a* and 15*b* illustrate exemplary user interface pages 1500 that function as flexible layout table maintenance display pages, according to an embodiment of the present disclosure. Layout table records, as listed in FIG. 15*a*, may designate rules and conditions for the display of layout tables in application 108. If a user selects a layout table record, the page may navigate to the user interface page depicted in FIG. 15*b*, showing an edit flexible layout page. From the edit flexible layout page, the display order of layout tables, the maximum number of rows and columns, and other static and/or dynamic styling rules may be determined.

FIG. 16 illustrates an exemplary user interface page that functions as a lookup data type code maintenance display page 1600, according to an embodiment of the present disclosure. The application 108 may contain many data types, and fields of differing data types may be rendered in differing manners. For example, date fields may contain a selectable calendar emblem, while a flag field may include a check box. Lookup data type code maintenance display page 1600 may allow a user to create, edit and/or delete data types used in the application 108.

Figure 17:
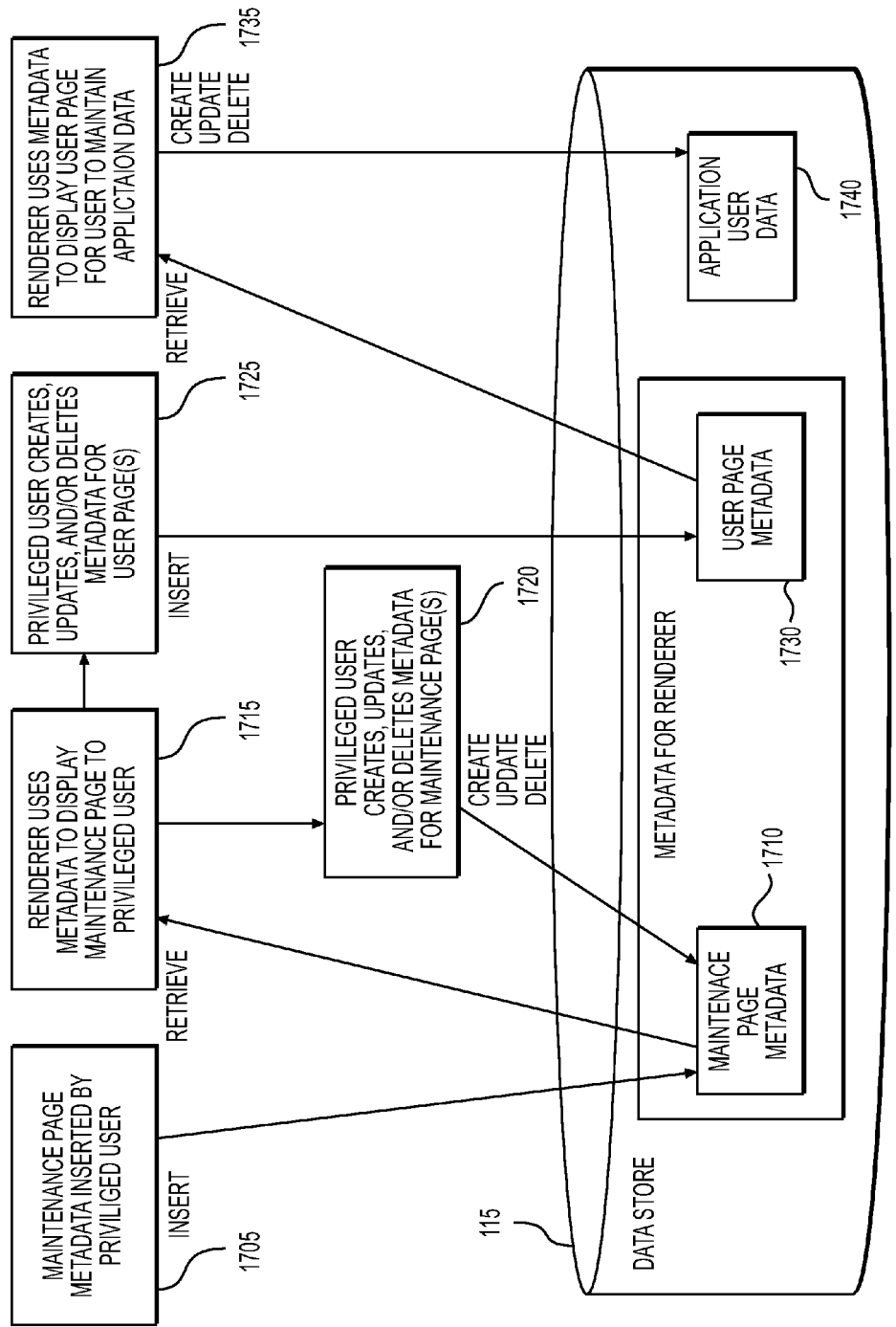
FIG. 17 is a schematic diagram of a data storage environment that allows the generation of user interface pages, according to an embodiment of the present disclosure.

FIG. 17 is a schematic diagram of a data storage environment that allows the generation of user interface pages. If a user, such as a privileged user, wishes to create an application 108, at step 1705, the user may insert metadata into Maintenance Page Metadata 1710. As maintenance pages may not yet exist, the user may interact with the data store 115 using commands such as SQL commands. Once sufficient metadata has been provided by the user, at step 1715 the renderer 110 may automatically render and display one or more maintenance pages to the user. The renderer 110 may retrieve metadata from the Maintenance Page Metadata 1710 in the data store for this purpose. The user may then proceed to either step 1720 or step 1725. At step 1720, the user may continue to create, update, and/or delete metadata that affects the appearance and functionality of the one or more maintenance pages. At step 1725, the user may utilize the one or more maintenance pages to create, update, and/or delete metadata stored in the User Page Metadata 1730. User Page Metadata 1730 may be used by the renderer 110 at step 1735 to create, and determine the appearance and functionality of, user interface pages associated with the application 108. If the user interface pages of application 108 maintain associated user data, the user interface pages may maintain Application User Data 1740 in the data store 115.

Figure 18:
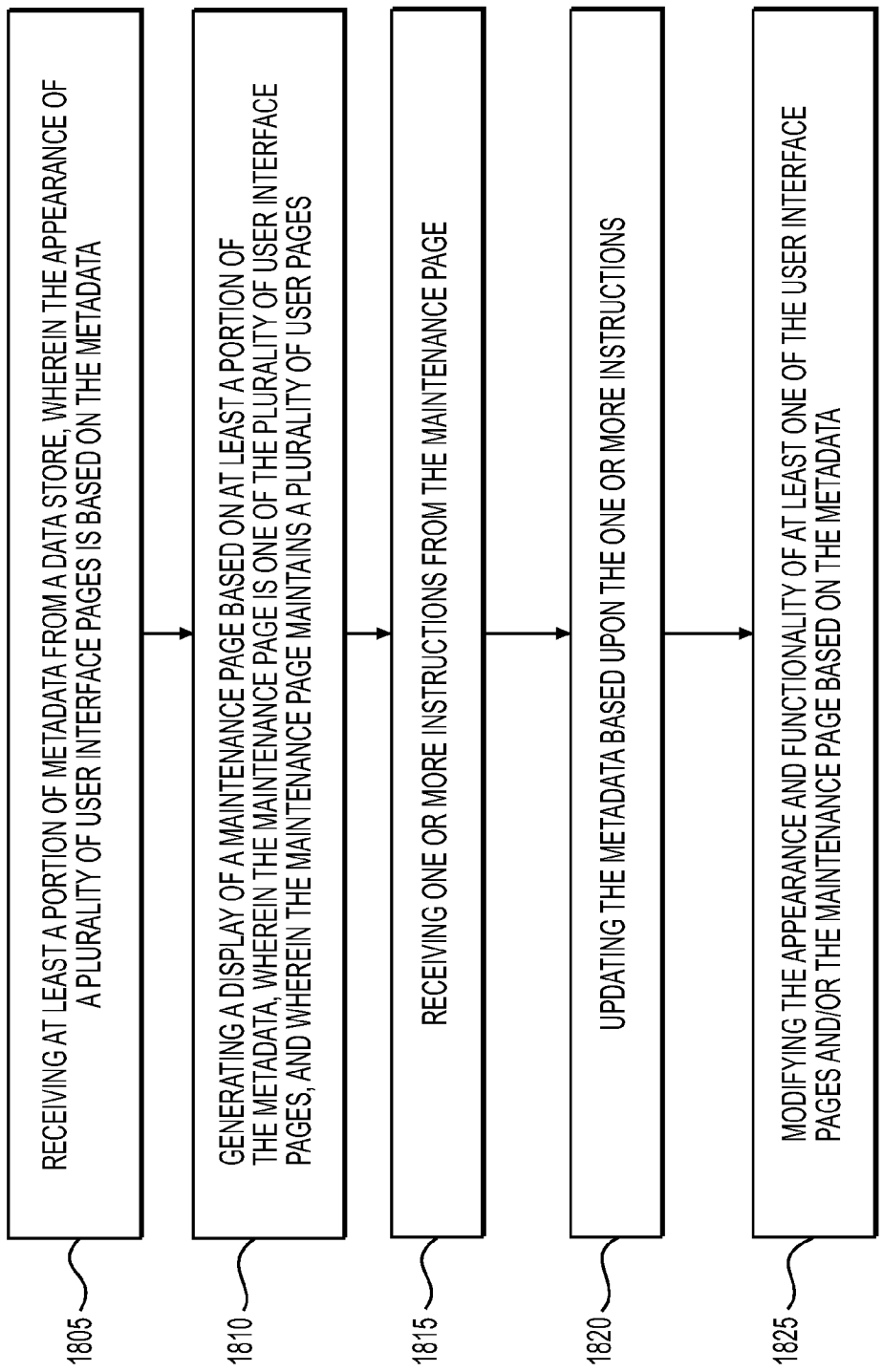
FIG. 18 is a flow diagram of an exemplary method for generating user interface pages from a data store, according to an embodiment of the present disclosure.

FIG. 18 is a flow diagram of an exemplary method for generating user interface pages from a data store. At step 1805, at least a portion of metadata from a data store may be received, wherein the appearance of a plurality of user interface pages is based on the metadata. At step 1810, a display of a maintenance page based on at least a portion of the metadata may be generated, wherein the maintenance page is one of the plurality of user interface pages, and wherein the maintenance page maintains the plurality of user interface pages. At step 1815, one or more instructions from the maintenance page may be received. At step 1820, the metadata based upon the one or more instructions may be updated. At step 1825, the appearance and functionality of the user interface and/or maintenance page may be modified based on the metadata.

One benefit of database-driven application generation techniques described herein is that the number of lines of source code that must be maintained for an application are reduced. Since user interfaces and application functionality may be modified without changing source code, software development life cycles may be compressed, allowing newer versions of the software to reach a production environment more quickly. Further, changes may be made to an application without requiring the use of highly trained software developers. Instead, privileged users with sufficient permissions may make changes to the application in a graphical user interface in real-time, and see the changes reflected in the production environment immediately or nearly immediately. Since the amount of source code associated with each software application is reduced, testing is typically faster and may be accomplished more easily. This helps reduce application maintenance costs. Further, application changes can be made entirely using database modifications, rather than source code changes. Since the source code is unchanging, the source code itself does not need debugging or tested when modifications are made. Changes made in the maintenance area may also propagate to a plurality of user interface pages Using techniques presented herein, application 108 may be used to generate a user-defined application system, including a navigational menu, user privileges, and interactive user interface pages. A large range of maintenance functionality may also be provided, such as the ability to view, insert, update, delete, etc., user-maintained data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

The examples described above with respect to FIGS. 1-19, or any part(s) or function(s) thereof, may be implemented using hardware, software modules, firmware, tangible computer readable media having instructions stored thereon, or a combination thereof and may be implemented in one or more computer systems or other processing systems.

Figure 19:
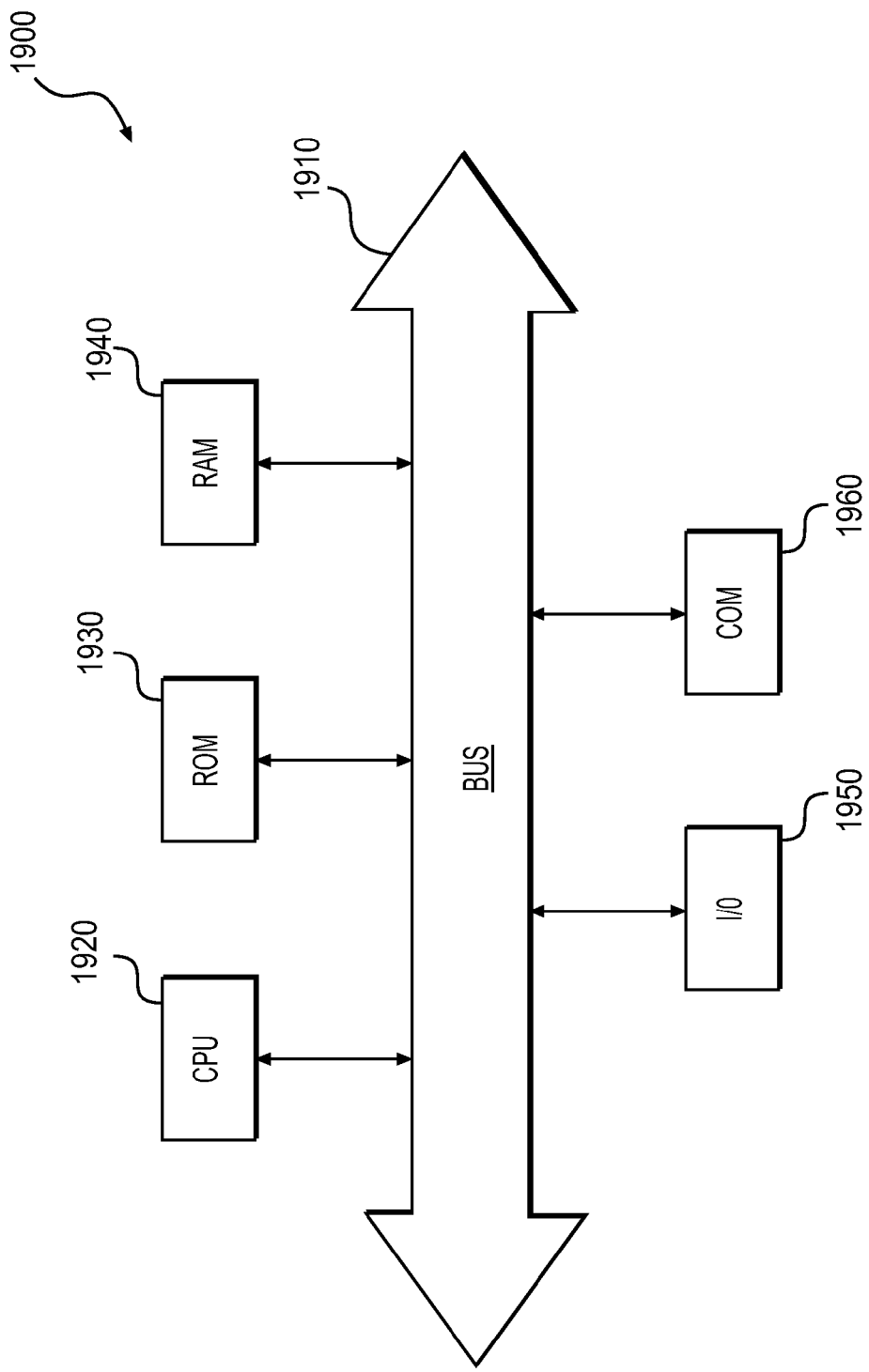
FIG. 19 is a block diagram of an exemplary computer system in which embodiments of the present disclosure may be implemented.

FIG. 19 illustrates a high-level functional block diagram of an exemplary computer system 1900, in which embodiments of the present disclosure, or portions thereof, may be implemented, e.g., as computer-readable code. For example, each of the exemplary devices and systems described above with respect to FIGS. 1-18 can be implemented in computer system 1900 using hardware, software, firmware, tangible computer readable media having instructions stored thereon, or a combination thereof and may be implemented in one or more computer systems or other processing systems. Hardware, software, or any combination of such may embody any of the modules and components in FIG. 1, as described above.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the present disclosure, as described above in the examples of FIGS. 1-18 may be implemented using computer system 1900. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 19, computer system 1900 includes a central processing unit (CPU) 1920. CPU 1920 may be any type of processor device including, for example, any type of special purpose or a general purpose microprocessor device. As will be appreciated by persons skilled in the relevant art, CPU 1920 also may be a single processor in a multi-core/multiprocessor system, such system operating alone, or in a cluster of computing devices operating in a cluster or server farm. CPU 1920 is connected to a data communication infrastructure 1910, for example, a bus, message queue, network, or multi-core message-passing scheme.

Computer system 1900 also includes a main memory 1940, for example, random access memory (RAM), and may also include a secondary memory 1930. Secondary memory 1930, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc. which is read by and written to by the removable storage drive. As will be appreciated by persons skilled in the relevant art, such a removable storage unit generally includes a computer usable storage medium having stored therein computer software and/or data.

In alternative implementations, secondary memory 1930 may include other similar means for allowing computer programs or other instructions to be loaded into computer system 1900. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to computer system 1900.

Computer system 1900 may also include a communications interface ("COM") 1960. Communications interface 1960 allows software and data to be transferred between computer system 1900 and external devices. Communications interface 1960 may include a modem, a network interface (such as an Ethernet card), a communications port, a PCMCIA slot and card, or the like. Software and data transferred via communications interface 1960 may be in the form of signals, which may be electronic, electromagnetic, optical, or other signals capable of being received by communications interface 1960. These signals may be provided to communications interface 1960 via a communications path of computer system 1900, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Computer system 1900 also may include input and output ports 1950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It would also be apparent to one of skill in the relevant art that the present disclosure, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

It is to be understood that both the foregoing general description and the following detailed description are exemplary and explanatory only and are not restrictive of the disclosed embodiments, as claimed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of generating interactive user interface pages from a database, comprising:
    receiving at least a portion of metadata from a database, the portion of the metadata being configured for defining the appearance of a plurality of interactive user interface pages;
    generating a display of a first interactive maintenance page based on the portion of the metadata received from the database, wherein the first interactive maintenance page is one of the plurality of interactive user interface pages, the first interactive maintenance page comprising a plurality of fields, and wherein the first interactive maintenance page enables creation and modification of the plurality of interactive user interface pages;
    receiving one or more instructions from a user via the plurality of fields of the first interactive maintenance page;
    updating the portion of the metadata received from the database based upon the one or more instructions to generate updated metadata associated with the appearance and functionality of the first interactive maintenance page to add to the plurality of fields a first maintenance field displayable on the first interactive maintenance page;
    modifying the appearance and functionality of the first interactive maintenance page based on the updated metadata, by adding the first maintenance field to the first interactive maintenance page without modifying source code associated with the generation of the first interactive maintenance page;
    receiving one or more additional instructions from the user via the first interactive maintenance page to update the updated metadata to create a second interactive maintenance page, wherein the second interactive maintenance page enables modification of the plurality of interactive user interface pages;
    receiving, via the first interactive maintenance page, one or more instructions to add a second maintenance field to the second interactive maintenance page, wherein the second interactive maintenance page and second maintenance field are created without modifying the source code, and wherein the second maintenance field is not present in the plurality of fields of the first interactive maintenance page;
    receiving, via the second maintenance field of the second interactive maintenance page, one or more instructions to modify the first interactive maintenance page; and
    displaying at least one of the plurality of interactive user interface pages based on the first maintenance field, the second maintenance field, the one or more instructions to modify the first interactive maintenance page, and the updated metadata.

2. The method of claim 1, further comprising:
    receiving one or more instructions to create a new interactive user interface page; and
    creating the new interactive user interface page in the plurality of interactive user interface pages by updating the metadata from the database, wherein the metadata from the database is updated based on the one or more instructions.

3. The method of claim 2, wherein the new interactive user interface page is created based on an unchanging source code.

4. The method of claim 2, wherein the new interactive user interface page is populated with metadata from the database associated with a second interactive user interface page.

5. The method of claim 1, further comprising:
receiving one or more instructions to delete an interactive user interface page from the plurality of interactive user interface pages; and
deleting the interactive user interface page from the plurality of interactive user interface pages by updating the metadata from the database and without modifying source code associated with the generation of the interactive user interface page, wherein the metadata from the database is updated based on the one or more instructions.

6. The method of claim 1, wherein generating the display of an interactive maintenance page further comprises:
receiving user identity information of a user;
identifying elements of the interactive maintenance page to which the user has permission to access; and
generating the display of the interactive maintenance page, wherein the display comprises the elements to which the user has permission to access.

7. The method of claim 1, further comprising:
receiving time or date information;
receiving a portion of the metadata from the database based on the time or date information; and
generating the display and functionality of at least one of the plurality of interactive user interface pages based on the time or date information.

8. The method of claim 1, further comprising:
receiving a request to render an interactive user interface page or the interactive maintenance page;
receiving a navigation path taken to reach the interactive user interface page or the interactive maintenance page;
if the navigation path corresponds to a first path, rendering the interactive user interface page or the interactive maintenance page in a first manner with a first set of one or more fields; and
if the navigation path corresponds to a second path, rendering the interactive user interface page or the interactive maintenance page in a second manner with a second set of one or more fields.

9. The method of claim 1, wherein the appearance and functionality of at least one of the interactive user interface pages and/or the interactive maintenance page is based at least in part on a set of one or more user-defined conditional rules stored in the metadata from the database.

10. A system for generating interactive user interface pages from a data storage device, the system including:
a data storage device storing instructions for generating interactive user interface pages in a network environment; and
a processor configured to execute the instructions to perform a method including:
receiving at least a portion of metadata from a database, wherein the appearance of a plurality of interactive user interface pages is based on the metadata from the database;
generating a display of a first interactive maintenance page based on a portion of the metadata from the database, wherein the first interactive maintenance page is one of the plurality of interactive user interface pages, the first interactive maintenance page comprising a plurality of fields, and wherein the first interactive maintenance page enables creation and modification of the plurality of interactive user interface pages;
receiving one or more instructions from a user via the plurality of fields of the first interactive maintenance page;
updating the portion of the metadata from the database based upon the one or more instructions to generate updated metadata associated with the appearance and functionality of the first interactive maintenance page to add a first maintenance field displayable on the first interactive maintenance page to the plurality of fields;
modifying the appearance and functionality of the first interactive maintenance page based on the updated metadata, by adding the first maintenance field on the first interactive maintenance page, without modifying source code associated with the generation of the first interactive maintenance page;
receiving one or more additional instructions from the user via the first interactive maintenance page to update the updated metadata to create a second interactive maintenance page, wherein the second interactive maintenance page enables modification of the plurality of interactive user interface pages;
receiving, via the first interactive maintenance page, one or more instructions to add a second maintenance field to the second interactive maintenance page, wherein the second interactive maintenance page and second maintenance field are created without modifying the source code, and wherein the second maintenance field is not present in the plurality of fields of the first interactive maintenance page;
receiving, via the second maintenance field of the second interactive maintenance page, one or more instructions to modify the first interactive maintenance page; and
displaying at least one of the plurality of interactive user interface pages based on the first maintenance field, the second maintenance field, the one or more instructions to modify the first interactive maintenance page, and the updated metadata.

11. The system of claim 10, wherein the processor is further configured for:
receiving one or more instructions to create a new interactive user interface page; and
creating the new interactive user interface page in the plurality of interactive user interface pages by updating the metadata from the database, wherein the metadata from the database is updated based on the one or more instructions.

12. The system of claim 11, wherein the new interactive user interface page is created based on an unchanging source code.

13. The system of claim 10, wherein the processor is further configured for:
receiving one or more instructions to delete an interactive user interface page from the plurality of interactive user interface pages; and
deleting the interactive user interface page from the plurality of interactive user interface pages by updating the metadata from the database and without modifying source code associated with the generation of the interactive user interface page, wherein the metadata from the database is updated based on the one or more instructions.

14. The system of claim 10, wherein generating the display of an interactive maintenance page further comprises:
receiving user identity information of a user;
identifying elements of the interactive maintenance page to which the user has permission to access; and
generating the display of the interactive maintenance page, wherein the display comprises the elements to which the user has permission to access.

15. The system of claim 10, wherein the processor is further configured for:
receiving time or date information;
receiving a portion of the metadata from the database based on the time or date information; and
generating the display and functionality of at least one of the plurality of interactive user interface pages based on the time or date information.

16. The system of claim 10, further comprising:
receiving a request to render an interactive user interface page or the interactive maintenance page;
receiving a navigation path taken to reach the interactive user interface page and/or the interactive maintenance page;
if the navigation path corresponds to a first path, rendering the interactive user interface page or the interactive maintenance page in a first manner with a first set of one or more fields; and
if the navigation path corresponds to a second path, rendering the interactive user interface page or the interactive maintenance page in a second manner with a second set of one or more fields.

17. A non-transitory computer-readable medium storing instructions that, when executed by a processor, cause the processor to perform a method for generating interactive user interface pages from a database, the method including:
receiving at least a portion of metadata from a database, wherein the appearance of a plurality of interactive user interface pages is based on the metadata from the database;
generating a display of a first interactive maintenance page based on a portion of the metadata from the database, wherein the first interactive maintenance page is one of the plurality of interactive user interface pages, the first interactive maintenance page comprising a plurality of fields, and wherein the first interactive maintenance page enables creation and modification of the plurality of interactive user interface pages;
receiving one or more instructions from a user via the plurality of fields of the first interactive maintenance page;
updating the portion of the metadata from the database based upon the one or more instructions to generate updated metadata associated with the appearance and functionality of the first interactive maintenance page to add a first maintenance field displayable on the first interactive maintenance page to the plurality of fields;
modifying the appearance and functionality of the first interactive maintenance page based on the updated metadata, by adding the first maintenance field on the first interactive maintenance page, without modifying source code associated with the generation of the first interactive maintenance page;
receiving one or more additional instructions from the user via the first interactive maintenance page to update the updated metadata to create a second interactive maintenance page, wherein the second interactive maintenance page enables modification of the plurality of interactive user interface pages;
receiving, via the first interactive maintenance page, one or more instructions to add a second maintenance field to the second interactive maintenance page, wherein the second interactive maintenance page and second maintenance field are created without modifying the source code, and wherein the second maintenance field is not present in the plurality of fields of the first interactive maintenance page;
receiving, via the second maintenance field of the second interactive maintenance page, one or more instructions to modify the first interactive maintenance page; and
displaying at least one of the plurality of interactive user interface pages based on the first maintenance field, the second maintenance field, the one or more instructions to modify the first interactive maintenance page, and the updated metadata.

18. The computer-readable medium of claim 17, the method further including:
receiving one or more instructions to create a new interactive user interface page; and
creating the new interactive user interface page in the plurality of interactive user interface pages by updating the metadata from the database, wherein the metadata from the database is updated based on the one or more instructions.

19. The computer-readable medium of claim 18, wherein the new interactive user interface page is created based on an unchanging source code.

20. The computer-readable medium of claim 17, the method further including:
receiving one or more instructions to delete an interactive user interface page from the plurality of interactive user interface pages; and
deleting the interactive user interface page from the plurality of interactive user interface pages by updating the metadata from the database and without modifying source code associated with generation of the interactive user interface page, wherein the metadata from the database is updated based on the one or more instructions.

* * * * *